(12) United States Patent
Ebrahimi et al.

(10) Patent No.: US 10,794,173 B2
(45) Date of Patent: Oct. 6, 2020

(54) BEARING FAULT DETECTION FOR SURFACE PUMPING UNITS

(71) Applicant: Weatherford Technology Holdings, LLC, Houston, TX (US)

(72) Inventors: Behrouz S. Ebrahimi, Houston, TX (US); Jeffrey John Lembcke, Cypress, TX (US); Clark E. Robison, Tomball, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 213 days.

(21) Appl. No.: 15/487,106

(22) Filed: Apr. 13, 2017

(65) Prior Publication Data
US 2018/0298744 A1    Oct. 18, 2018

(51) Int. Cl.
*E21B 47/009*    (2012.01)
*F04B 47/02*     (2006.01)
(Continued)

(52) U.S. Cl.
CPC ........ *E21B 47/009* (2020.05); *E21B 41/0092* (2013.01); *E21B 43/127* (2013.01);
(Continued)

(58) Field of Classification Search
CPC ............. E21B 47/0008; E21B 41/0092; E21B 43/127; E21B 2043/125; G01M 13/045; F04B 49/10; F04B 47/02
See application file for complete search history.

(56) References Cited

U.S. PATENT DOCUMENTS 3,269,320 A * 8/1966 Fredriksson ............ E21B 43/12
                                                    417/1
4,561,299 A * 12/1985 Orlando .............. E21B 47/0008
                                                  33/366.14
(Continued)

FOREIGN PATENT DOCUMENTS

| CA | 2526345 A1 | 4/2007 |
| WO | 2013096254 A1 | 6/2013 |
| WO | 2013180727 A1 | 12/2013 |

OTHER PUBLICATIONS

International Search Report and Written Opinion dated Jun. 11, 2018, corresponding to Application No. PCT/US2018/023342.
(Continued)

*Primary Examiner* — David J Bagnell
*Assistant Examiner* — Jonathan Malikasim
(74) *Attorney, Agent, or Firm* — Patterson + Sheridan, LLP (57) ABSTRACT

Methods and apparatus for operating a rod pumping unit for a wellbore are provided. One example method includes measuring vibration data in the time domain using at least one sensor coupled to a housing for a moving component of the rod pumping unit; converting the vibration data in the time domain to vibration data in the frequency domain; determining that: (1) at least one frequency component of the frequency-domain vibration data in a first frequency band has a power above a first threshold; or (2) a number of frequency components of the frequency-domain vibration data in a second frequency band having power above a second threshold is above a third threshold; and outputting an indication based on the determination.

22 Claims, 9 Drawing Sheets

(51) Int. Cl.
*F04B 49/10* (2006.01)
*E21B 43/12* (2006.01)
*E21B 41/00* (2006.01)
*G01M 13/045* (2019.01)

(52) U.S. Cl.
CPC .............. *F04B 47/02* (2013.01); *F04B 49/10* (2013.01); *G01M 13/045* (2013.01)

(56) References Cited

U.S. PATENT DOCUMENTS

| | | | | |
|---|---|---|---|---|
| 5,503,225 | A * | 4/1996 | Withers | B09B 1/008 166/250.1 |
| 6,206,108 | B1 * | 3/2001 | MacDonald | E21B 44/00 175/24 |
| 6,801,864 | B2 * | 10/2004 | Miller | G01M 13/045 702/56 |
| 6,802,221 | B2 * | 10/2004 | Hedeen | G01M 13/045 73/587 |
| 7,032,659 | B2 * | 4/2006 | Barnes | F04B 47/02 166/104 |
| 7,394,395 | B2 * | 7/2008 | Sakatani | G01H 1/003 340/679 |
| 7,421,349 | B1 * | 9/2008 | Stack | G01M 13/045 340/500 |
| 9,464,671 | B2 * | 10/2016 | Hebrard | F16C 41/00 |
| 9,618,037 | B2 * | 4/2017 | Kar | F16C 19/52 |
| 9,903,193 | B2 * | 2/2018 | Harding | E21B 47/0008 |
| 2002/0139191 | A1 | 10/2002 | Hedeen et al. | |
| 2014/0305636 | A1 | 10/2014 | Paulet et al. | |
| 2015/0345280 | A1 * | 12/2015 | Krauss | E21B 43/127 700/282 |
| 2017/0090457 | A1 | 3/2017 | Pandurangan et al. | |

OTHER PUBLICATIONS

U.S. Appl. No. 15/212,008, filed Jul. 15, 2016.
U.S. Appl. No. 15/345,288, filed Nov. 7, 2016.

* cited by examiner

BEARING FAULT DETECTION FOR SURFACE PUMPING UNITS

BACKGROUND OF THE DISCLOSURE

Field of the Disclosure

Aspects of the present disclosure generally relate to hydrocarbon production using artificial lift and, more particularly, to operating a rod pumping unit based on measurements of one or more sensed parameters associated with the rod pumping unit.

Description of the Related Art

Several artificial lift techniques are currently available to initiate and/or increase hydrocarbon production from drilled wells. These artificial lift techniques include rod pumping, plunger lift, gas lift, hydraulic lift, progressing cavity pumping, and electric submersible pumping, for example.

One common problem with the rod pumping unit is that various moving components of the rod pumping unit may wear down over time, thereby leading to shutdown of the rod pumping unit. Examples of these moving components include bearings and gears.

Thus, there is a need for apparatus and methods of monitoring wear of moving components of the rod pumping unit.

SUMMARY OF THE DISCLOSURE

Aspects of the present disclosure generally relate to measuring one or more parameters associated with a rod pumping unit and taking a course of action or otherwise operating the rod pumping unit based on the measured parameters.

Certain aspects of the present disclosure provide a method for operating a rod pumping unit for a wellbore. The method generally includes measuring vibration data in the time domain using at least one sensor coupled to a housing for a moving component of the rod pumping unit; converting the vibration data in the time domain to vibration data in the frequency domain; determining that: (1) at least one frequency component of the frequency-domain vibration data in a first frequency band has a power above a first threshold; or (2) a number of frequency components of the frequency-domain vibration data in a second frequency band having power above a second threshold is above a third threshold; and outputting an indication based on the determination.

Certain aspects of the present disclosure provide an apparatus for monitoring a moving component in a rod pumping unit for a wellbore. The apparatus includes at least one sensor configured to measure vibration data associated with the moving component in the time domain and at least one processor electrically coupled to the sensor. The at least one processor is generally configured to convert the vibration data in the time domain to vibration data in the frequency domain; to determine that: (1) at least one frequency component of the frequency-domain vibration data in a first frequency band has a power above a first threshold; or (2) a number of frequency components of the frequency-domain vibration data in a second frequency band having power above a second threshold is above a third threshold; and to output an indication based on the determination.

Certain aspects of the present disclosure provide a non-transitory computer-readable medium for operating a rod pumping unit for a wellbore. The medium generally includes instructions executable by one or more processors to receive vibration data in the time domain from at least one sensor coupled to a housing for a moving component of the rod pumping unit; to convert the vibration data in the time domain to vibration data in the frequency domain; to determine that: (1) at least one frequency component of the frequency-domain vibration data in a first frequency band has a power above a first threshold; or (2) a number of frequency components of the frequency-domain vibration data in a second frequency band having power above a second threshold is above a third threshold; and output an indication based on the determination.

Certain aspects of the present disclosure provide an apparatus. The apparatus generally includes means for measuring vibration data associated with a moving component in a rod pumping unit in the time domain; means for converting the vibration data in the time domain to vibration data in the frequency domain; means for determining that: (1) at least one frequency component of the frequency-domain vibration data in a first frequency band has a power above a first threshold; or (2) a number of frequency components of the frequency-domain vibration data in a second frequency band having power above a second threshold is above a third threshold; and means for outputting an indication based on the determination.

Certain aspects of the present disclosure provide a method for operating a rod pumping unit for a wellbore. The method generally includes measuring vibration data in the time domain using at least one sensor coupled to a housing for a moving component of the rod pumping unit; converting the vibration data in the time domain to vibration data in the frequency domain; quantifying a life of the moving component based on the frequency-domain vibration data; and outputting an indication based on the quantification.

Certain aspects of the present disclosure provide a non-transitory computer-readable medium for operating a rod pumping unit for a wellbore. The medium generally includes instructions executable by one or more processors to receive vibration data in the time domain from at least one sensor coupled to a housing for a moving component of the rod pumping unit; to convert the vibration data in the time domain to vibration data in the frequency domain; to quantify a life of the moving component based on the frequency-domain vibration data; and to output an indication based on the quantification.

Certain aspects of the present disclosure provide an apparatus for monitoring a moving component in a rod pumping unit for a wellbore. The apparatus includes at least one sensor configured to measure vibration data associated with the moving component in the time domain and at least one processor electrically coupled to the sensor. The at least one processor is generally configured to convert the vibration data in the time domain to vibration data in the frequency domain; to quantify a life of the moving component based on the frequency-domain vibration data; and top output an indication based on the quantification.

Certain aspects of the present disclosure provide an apparatus. The apparatus generally includes means for measuring vibration data associated with a moving component in a rod pumping unit in the time domain; means for converting the vibration data in the time domain to vibration data in the frequency domain; means for quantifying a life of the moving component based on the frequency-domain vibration data; and means for outputting an indication based on the quantification.

BRIEF DESCRIPTION OF THE DRAWINGS

So that the manner in which the above-recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this disclosure and are therefore not to be considered limiting of its scope, for the disclosure may admit to other equally effective aspects.

DETAILED DESCRIPTION

Aspects of the present disclosure provide techniques and apparatus for measuring one or more parameters associated with an artificial lift system for hydrocarbon production and operating the system based on the measured parameters.

Figure 1:
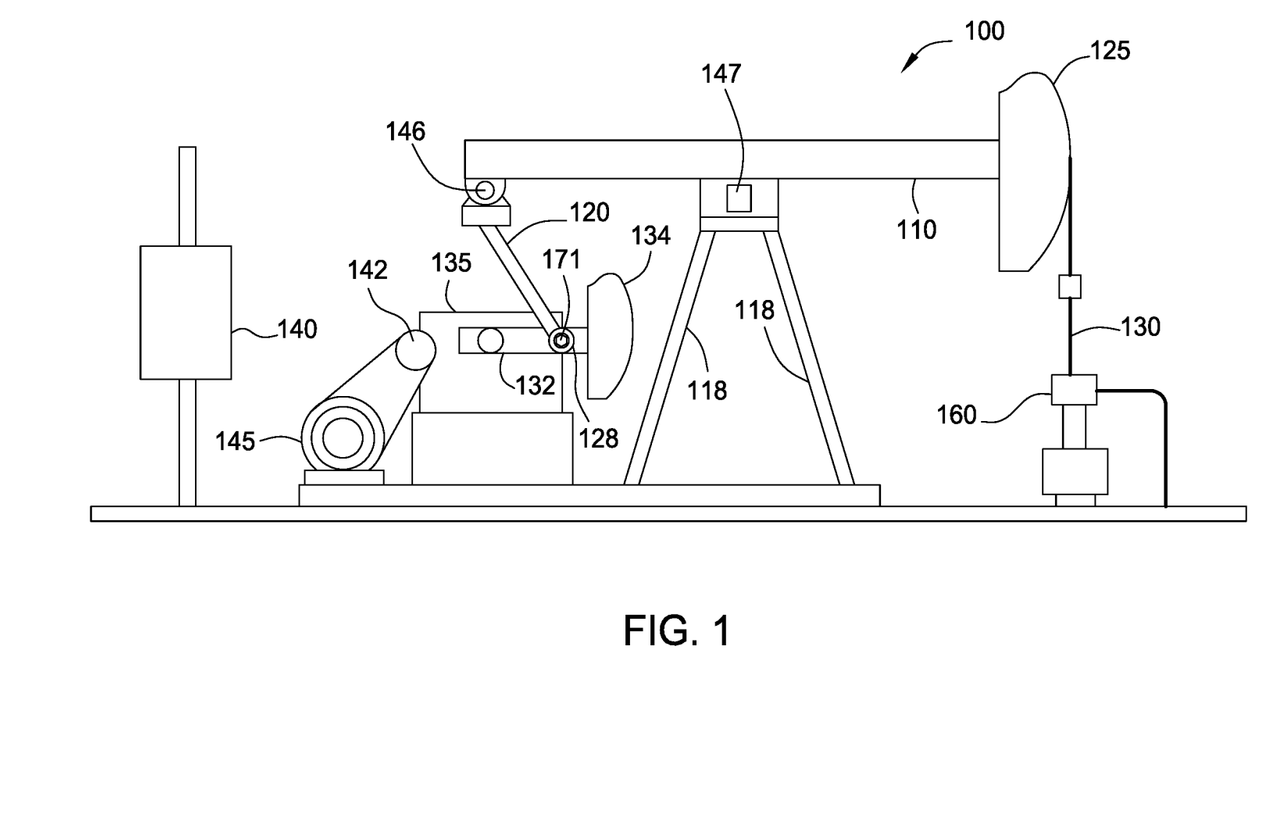
FIG. 1 is a schematic depiction of an example rod pumping unit.

FIG. 1 shows an example rod pumping unit 100. The rod pumping unit 100 includes a walking beam 110 operatively connected to one or more posts 118 via a saddle 147. Attached to one end of the walking beam 110 is a horse head 125 operatively connected to a polished rod 130. A rod string (not shown) is connected below the polished rod 130 and is connected to a down-hole pump (not shown). The polished rod 130 is axially movable inside the wellhead 160. The walking beam 110 is coupled to a motor 145 using a crank arm 132 and gearbox 135, which is described in more detail below. The rod pumping unit 100 is operated by a motor control panel 140 and powered by the motor 145.

To move the walking beam 110, a pitman arm 120 may be coupled to one end of the walking beam by a tail 146 or equalizer bearing assembly. For certain aspects, the rod pumping unit 100 may include two pitman arms 120 joined by an equalizer beam. The equalizer beam may be connected to the walking beam 110 by the bearing assembly. Each pitman arm 120 may be pivotably connected to the crank arm 132 by a crank pin assembly 128, also called a wrist pin. The crank arm 132 may be rotated by a motor 145 connected by a belt to a sheave 142, with the gearbox 135 connected between the sheave 142 and the crank arm 132. One or more counterweight blocks 134 may be attached to the crank arm 132.

One common problem with the rod pumping unit 100 is that various moving components of the rod pumping unit 100 may wear down over time, thereby leading to shut down of the rod pumping unit 100. Examples of these moving components include gears in the gearbox 135 and bearings located in or otherwise associated with the crank pin assembly 128 (e.g., in the wrist pin housing), the tail 146, and the saddle 147.

Aspects of the present disclosure provide methods and apparatus for monitoring the physical condition of at least some of these moving components. The moving components' health may be monitored by measuring vibration experienced by those moving components. In one aspect, the rod pumping unit 100 may include one or more sensors to detect and monitor vibration of moving components of the rod pumping unit 100. For example, the rod pumping unit 100 may include a sensor 171 (e.g., an accelerometer) to measure the vibration of the bearings in the wrist pin housing. The sensor 171 may be positioned on the wrist pin cap close to the wrist pin bearings. Additionally or alternatively, one or more other sensors (not shown) may be positioned at suitable locations on the rod pumping unit 100 to measure the vibration of other components, such as bearings in the tail 146, bearings in the saddle 147, and/or bearings in the gearbox 135.

In one aspect, the accelerometer is a microelectromechanical system (MEMS)-based accelerometer. The accelerometer may be configured to produce an electrical signal with an amplitude that is proportional to the acceleration of the vibrating component to which the accelerometer is attached. The g-force measured by the accelerometer may be monitored over time to determine vibrational trends in frequencies and amplitudes in the wrist pin bearings. Another example of the sensor 171 for measuring vibration of the bearings includes acoustic sensors, such as microphones or piezoelectric sensors. A certain frequency component, a number of frequency components in a particular frequency range, and/or the power of certain frequency components may indicate various levels of wear in the wrist pin bearings. In this manner, the sensor 171 (and associated sensor assembly) may be useful in helping prevent further damage to the rod pumping unit 100.

Figure 2:
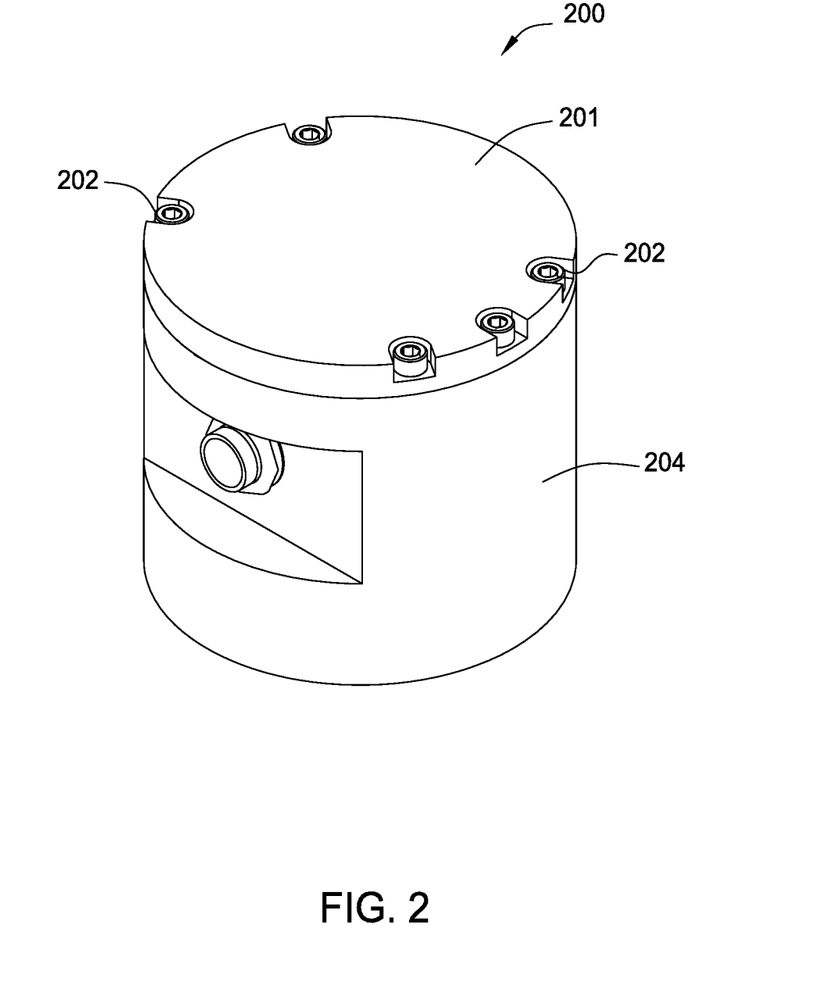
FIG. 2 shows an example housing for a sensing device for monitoring bearing wear, in accordance with certain aspects of the present disclosure.

FIG. 2 shows an example housing 200 for a sensor assembly (not shown here, but depicted in FIG. 3) for monitoring bearing wear, in accordance with certain aspects of the disclosure. In this aspect, the housing 200 is rigid to transmit the vibrations to the sensor 171, as well as to protect the sensor assembly. The housing 200 includes a location for the sensor 171 and a local power supply. Additionally, the housing 200 may provide for attachment to the rod pumping unit 100. The housing 200 may be configured to attach permanently or temporarily to a location where the sensor assembly is able to detect vibrations. For example, the housing 200 may be magnetically coupled to or bolted onto the wrist pin housing. The wrist pin housing is a suitable location because the housing 200 has a direct connection to the wrist pin housing that permits any vibrations to be transmitted from the bearings to the wrist pin housing, to the housing 200, and to the sensor(s) in the sensor assembly.

The housing 200 may include a lid 201 and a receptacle 204. The sensor assembly may be disposed in and held in place by the receptacle 204. The lid 201 may be attached to the receptacle 204 via any suitable mechanical coupling method, such as bolts or a threaded connection. For certain aspects as illustrated in FIG. 2, the lid 201 may include holes for bolts 202, such that the lid 201 may be bolted onto the receptacle 204. For certain aspects, the housing 200 may be cylindrical, with a height less than its diameter, and thus, may be referred to as a "hockey puck." The sensor assembly may be susceptible to airborne vibrations. Consequently, the housing 200 may also include sound-dampening material to attenuate this vibrational noise and focus the measuring on the vibrations due to the bearings.

Figure 3:
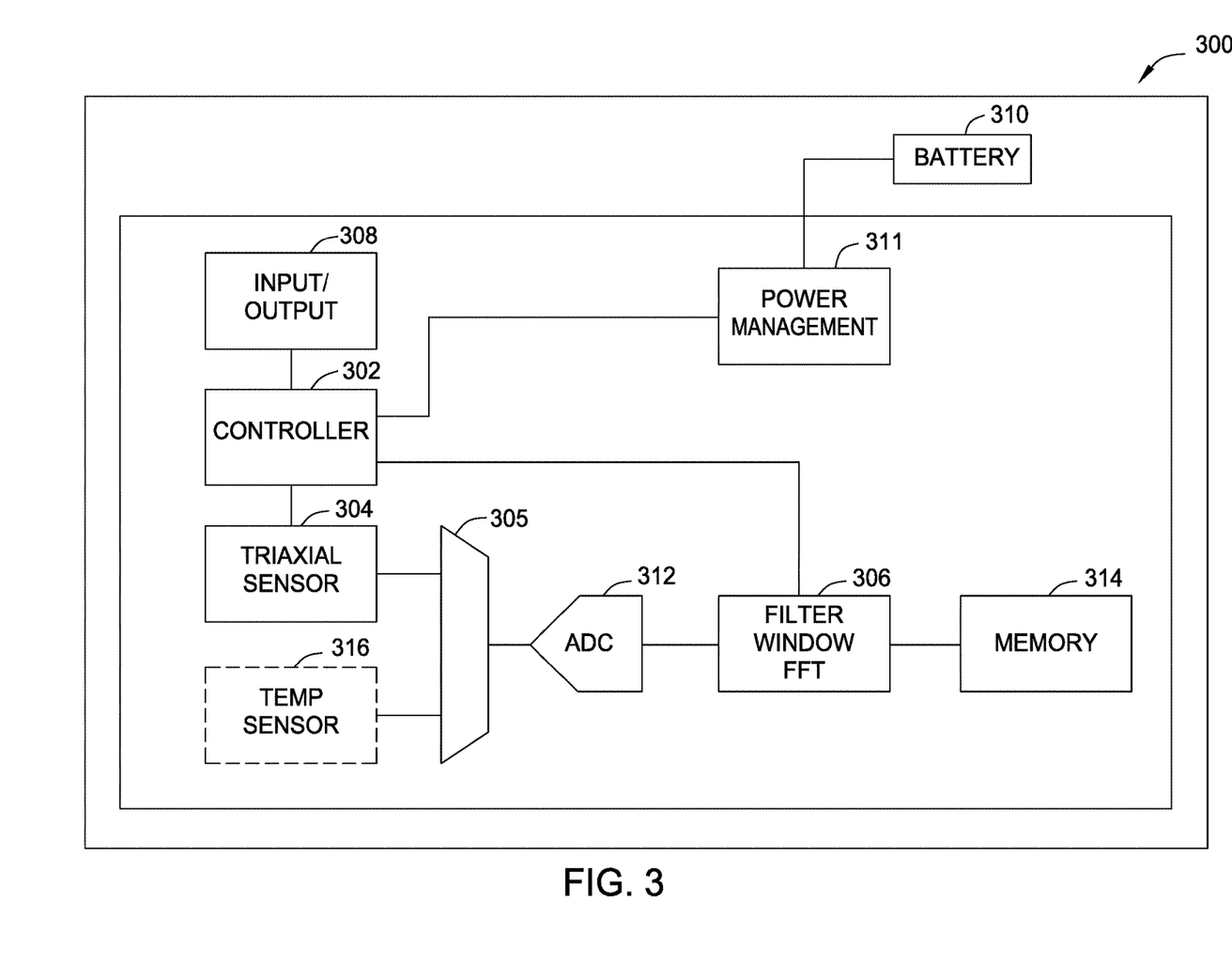
FIG. 3 is a block diagram of an example sensing device for monitoring bearing wear, in accordance with certain aspects of the present disclosure.

FIG. 3 is a block diagram of a sensor assembly 300 for monitoring bearing wear, in accordance with certain aspects of the disclosure. The sensor assembly 300 may include at least one processor (e.g., a controller 302), one or more vibrational sensors 304, an analog-to-digital converter (ADC) 312, a time-to-frequency-domain converter 306, and memory 314. The one or more vibrational sensors 304 of the sensor assembly 300 may be accelerometers, for example, and in this case, may be oriented in one, two, three, or more axes (e.g., a triaxial accelerometer). An accelerometer may be used to measure the magnitude of vibrations in the direction of the accelerometer's axis of orientation. For certain aspects, an analog filter (e.g., a low-pass filter, which may also be referred to as an anti-aliasing filter) may be applied before the ADC 312 in an effort to filter out high frequencies outside the frequency band of interest, before these higher frequencies are aliased into the passband by the act of sampling. For certain aspects, a digital filter (e.g., a low-pass filter or a notch filter) may be applied after the ADC 312 in an effort to remove unwanted frequencies (e.g., higher frequencies) from the frequency band of interest. The digital filter may be implemented with a digital signal processor (DSP), which may be a standalone processor or part of another processor (e.g., the controller 302 or the time-to-frequency-domain converter 306).

The sensor assembly 300 may have an input/output (I/O) interface 308, which may be configured for wired and/or wireless implementations (e.g., Bluetooth or WiFi in accordance with IEEE 802.11). The I/O interface 308 may have one or more communication ports, antennas, and radio frequency (RF) front-ends for remote communication with a control element, such as the motor control panel 140, or other processing system. A power supply 310 and power management circuitry 311 may provide suitable power for the sensor assembly 300. The power supply 310 may include a battery.

The time-to-frequency-domain converter 306 may be implemented with a digital signal processor (DSP), which may be a standalone processor or part of another processor (e.g., the controller 302). The time-to-frequency-domain converter 306 may implement a fast Fourier transform (FFT) or a discrete Fourier transform (DFT), for example, to convert time-based vibrational data to frequency-based data. The sensor assembly 300 may include memory 314 for storing the frequency-domain vibrational data and/or for storing instructions for the controller 302. For certain aspects, the sensor assembly 300 may also include a temperature sensor 316. In the case of more than one sensor 304, the sensor assembly may include a multiplexer (MUX) 305 configured to selectively route an output of one of the vibrational sensors 304 or the optional temperature sensor 316 to the ADC 312 for sampling.

For certain aspects, the sensor assembly 300 may be implemented with separate components (e.g., different integrated circuits (ICs) for the controller 302 and the ADC 312), whereas for other aspects, at least a portion of the sensor assembly may be pre-packaged and sold as an off-the-shelf sensing unit (e.g., a system on a chip (SoC)). For example, one suitable off-the-shelf sensing unit is the ADIS16227, a digital triaxial vibration sensor with FFT analysis and storage, available from Analog Devices, Inc. of Norwood, Mass.

Bearing wear may occur due to sand or other foreign objects in a housing containing the bearing. As the bearing wears, more room to vibrate becomes available and as vibration increases so too does the amount of wear. Bearing wear occurs in four levels (also referred to as stages). Each next higher level indicates a greater degree of bearing wear. Each level of bearing wear is associated with certain frequencies (which may be referred to as "defect frequencies") that occur due to the vibration of the bearings. These frequencies can be observed by certain sensors, such as accelerometers. Conventionally, the frequencies of interest for studying wear of components in various types of pumps have been relatively high (e.g., above 8 kHz). However, the frequencies associated with bearing wear in a rod pumping unit are significantly lower (e.g., less than 20 Hz). In fact the lowest frequencies (typically 3 Hz or less) may be representative of the defect frequencies that are characteristic of each bearing configuration (e.g., whether in the wrist pin housing, the tail, the saddle, or the gearbox of the rod pumping unit) at different wear levels.

Methods of the present disclosure involve analyzing bearing vibrational data in the frequency domain to provide for quantifying the life of a bearing in various stages. The first two levels of bearing wear indicate normal wear and/or minor defects and do not usually signify that the bearings require attention. Level one and level two bearing wear may be identified by particular characteristics of the frequency-domain bearing vibrational data (e.g., certain defect frequencies or their harmonics being present). For the purposes of a rod pumping unit, critical and non-critical bearings showing level three wear should most likely be replaced before reaching level four wear. A bearing showing level three wear has clearly visible defects in the raceways and rolling elements. If the amplitude of certain defect frequencies exceeds a particular threshold, then it may be assumed that the wear in the bearings is progressing to a level that may be considered for replacement. Furthermore, harmonics of these defect frequencies may be observed in relatively higher frequency ranges (e.g., 3 to 8 Hz). The combination of (1) high amplitudes of the lowest (fundamental) frequencies and (2) the presence and number of the measured harmonics may provide a more reliable means of determining the need for replacement, compared to either indication taken alone. Additionally, the presence of, proliferation of, and/or amplitude of other non-harmonic frequencies may also indicate advanced wear or damage. The windowing (e.g., determined by threshold amplitudes and frequency ranges) described below provide a convenient way to characterize level 3 and 4 bearing wear. However, a bearing may not be considered as being "worn out" until a combination of frequencies and amplitudes in the frequency spectrum indicates a very "noisy" environment.

Figure 4A:
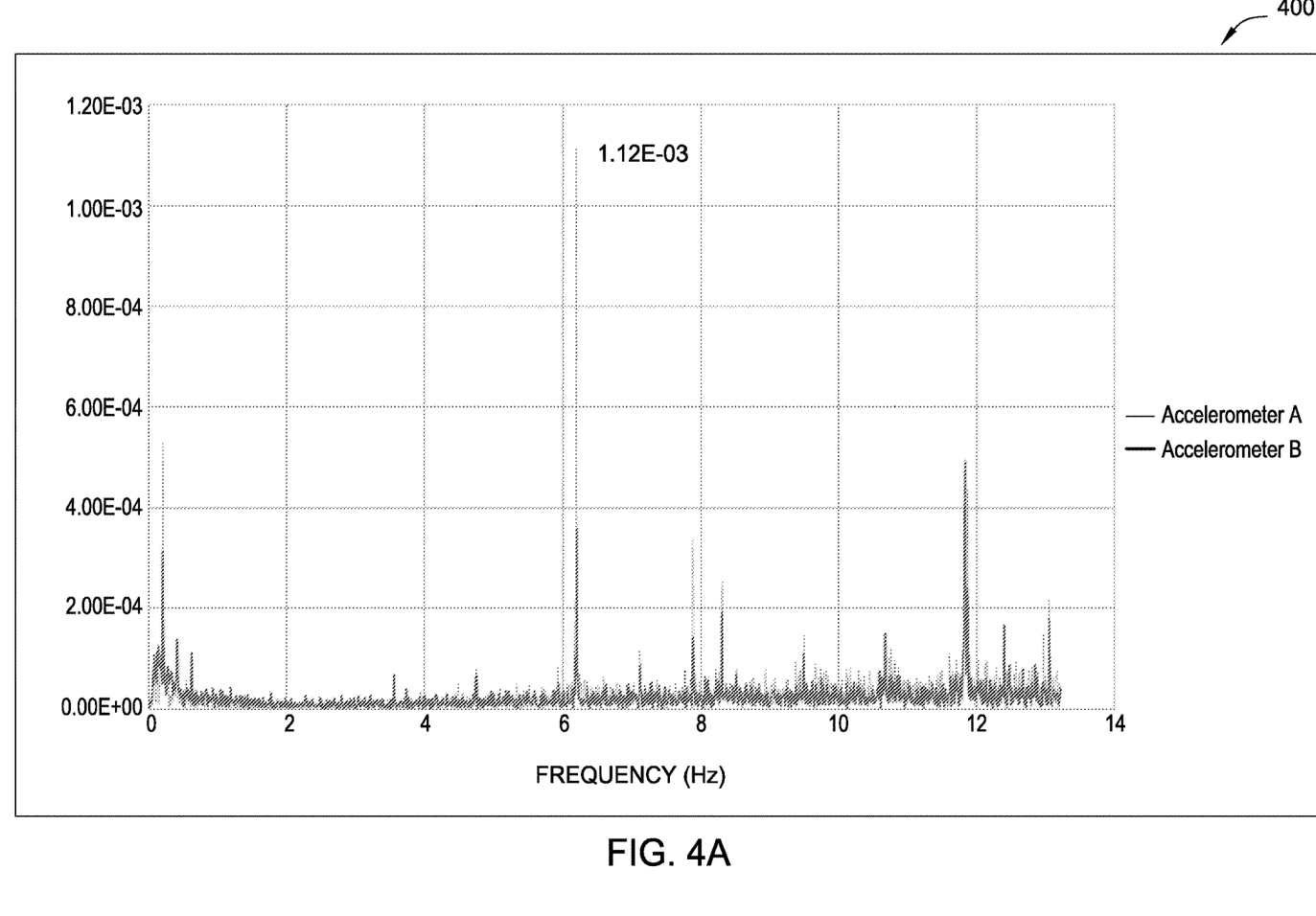
FIG. 4A shows an example frequency spectrum of vibrational amplitudes versus frequency, in accordance with certain aspects of the present disclosure.

FIG. 4A shows an example frequency spectrum 400 of vibrational power versus frequency collected from two different accelerometers (Accelerometer A and Accelerometer B), in accordance with certain aspects of the disclosure. The vibrational data from the accelerometers may be converted from time-based data to frequency-based data and plotted to generate the frequency spectrum 400. In the sensor assembly 300, for example, the time-to-frequency-domain converter 306 may perform this conversion, as described above.

Figure 4B:
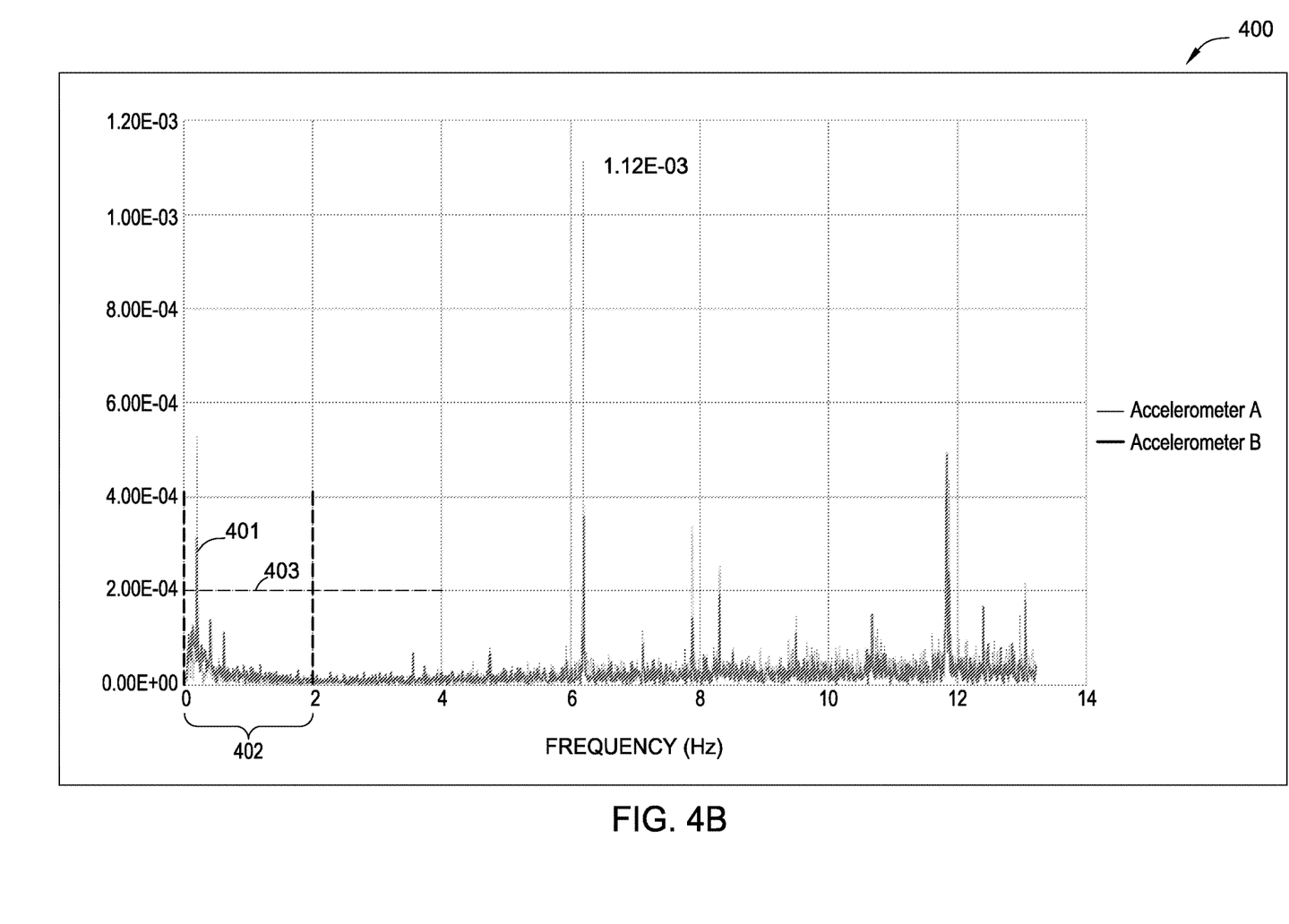
FIG. 4B shows a threshold amplitude associated with relatively lower frequencies on the frequency spectrum of FIG. 4A, in accordance with certain aspects of the present disclosure.

To determine level three bearing wear in a rod pumping unit or other low frequency machinery, a threshold amplitude 403 is shown in FIG. 4B on the frequency spectrum 400 of FIG. 4A. This threshold amplitude 403 may be applied to a frequency range 402 of relatively lower frequencies (e.g., less than 6 Hz, less than 4 Hz, or less than 2 Hz) in the frequency spectrum 400. For example, it may be determined that level three bearing wear is demonstrated on the frequency spectrum 400 if any frequency components 401 have vibrational amplitudes exceeding $2.0 \times 10^{-4}$ g (an example threshold amplitude 403) for frequencies between 0 and 2 Hz (an example frequency range 402), as illustrated in FIG. 4B. The frequency range 402 and/or threshold amplitude 403 may be stored in memory (e.g., memory 314) and adjusted by a processor (e.g., the controller 302 and/or the time-to-frequency-domain converter 306) in the sensor assembly, during initialization before use or during operation.

Level four wear indicates that the bearing is approaching the end of its life and needs to be replaced, before failure of the rod pumping unit occurs. One indicator for level four bearing wear in a rod pumping unit may manifest as an increase in the quantity of frequency peaks in relatively higher frequencies (e.g., in frequencies between about 6 Hz and 13 Hz). These higher frequencies may be unrelated to the defect frequencies that are actually due to the damage that has occurred, or these frequencies may be harmonics of the fundamental defect frequencies. The windowing and analysis may include both aspects.

Figure 4C:
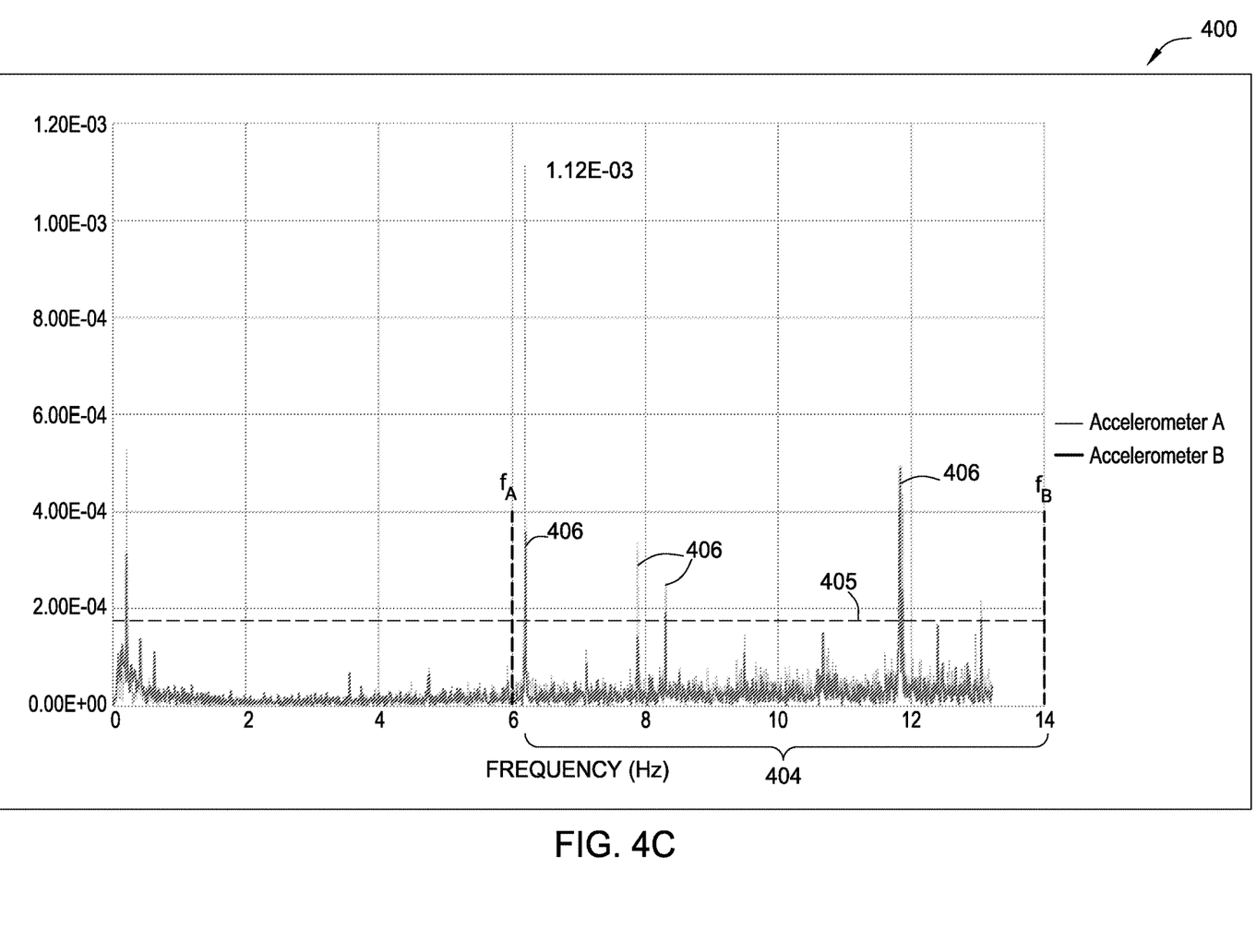
FIG. 4C shows a frequency range associated with relatively higher frequencies on the frequency spectrum of FIG. 4A, in accordance with certain aspects of the present disclosure.

FIG. 4C shows an example frequency range for level four bearing wear on the frequency spectrum 400 of FIG. 4A, in accordance with certain aspects of the disclosure. One example indicator for level four bearing wear is related to the quantity of frequency components 406 having peaks (e.g., power levels) above a particular threshold 405 in a particular frequency range 404 (e.g., between frequencies $F_A$ and $F_B$ inclusive) in the frequency spectrum. In FIG. 4C, this range of frequencies is about 6 to 13 Hz. The quantity of frequency components may also be referred to as "the count" of frequency components above the threshold in this frequency range. If the count is determined to exceed a predetermined number (another type of threshold), then the bearing wear may be determined to be level four. In this case, the sensor assembly may output a control signal or other indication that shuts down the rod pumping unit. This shut-down signal may be transmitted (wirelessly or otherwise) to the motor control panel 140.

Figure 5A:
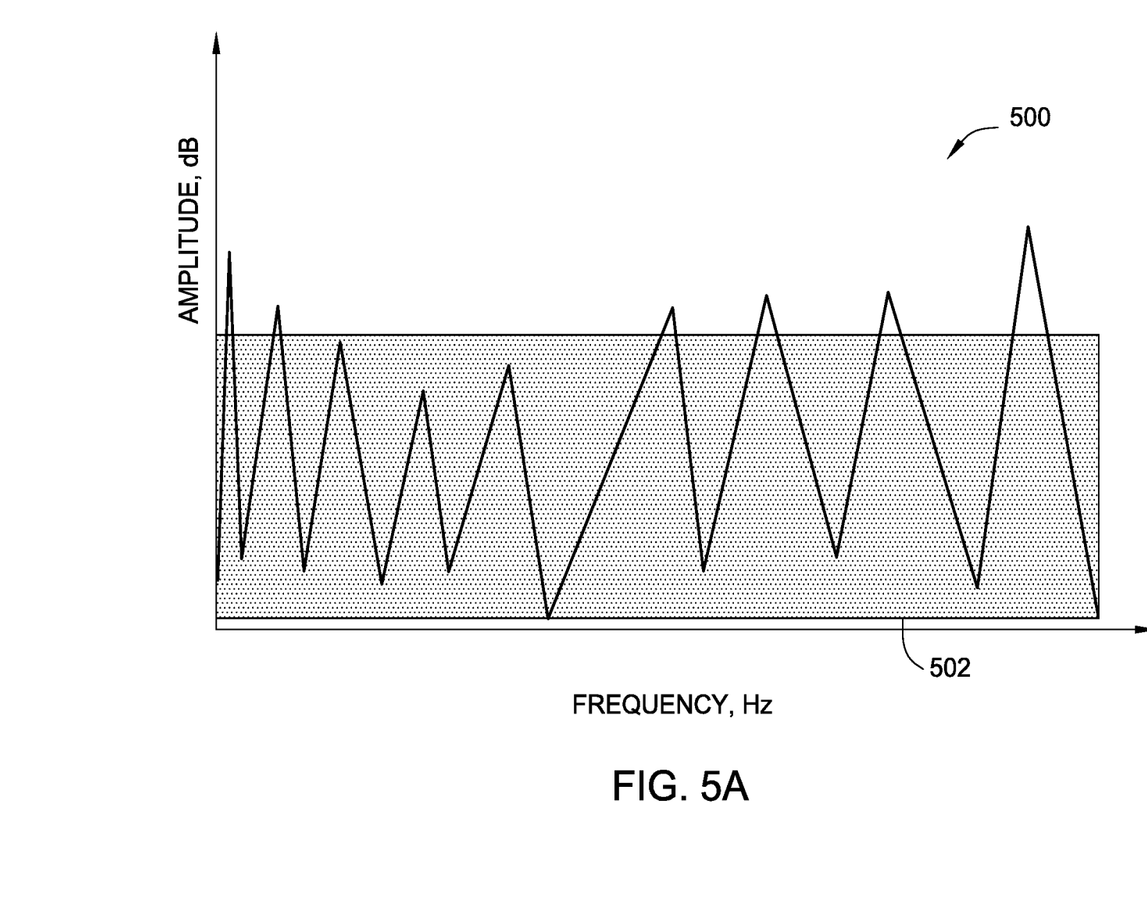
FIG. 5A shows an example frequency spectrum with a window focused on predetermined values, in accordance with certain aspects of the present disclosure.

In one aspect, the frequency spectrum focuses on a specific range of frequencies and amplitudes that create a window 502. FIG. 5A shows an example frequency spectrum 500 with a window 502 focused on predetermined values, in accordance with certain aspects of the disclosure. The default values for the window 502 may be determined based on several parameters of the specific bearing and the particular rod pumping unit, such as the size and type of the bearing or the size of the rod pumping unit. The window 502 may be sized to control when a threshold amplitude or a count of frequency components has been exceeded (e.g., either level three or level four thresholds), which may trigger a signal being sent to the pump off controller, an alarm being raised (e.g., sounded), and/or another type of notification occurring. The top edge of the window 502 may set the threshold amplitude in the frequency spectrum 500. Additionally, filters may be applied in the frequency domain and configured to exclude or at least attenuate frequencies outside of the range of interest (i.e., the sides of the window 502). Filtering the raw signals in this manner may allow focusing on the frequencies in the range of interest (i.e., inside the window 502), thereby improving analysis.

Figure 5B:
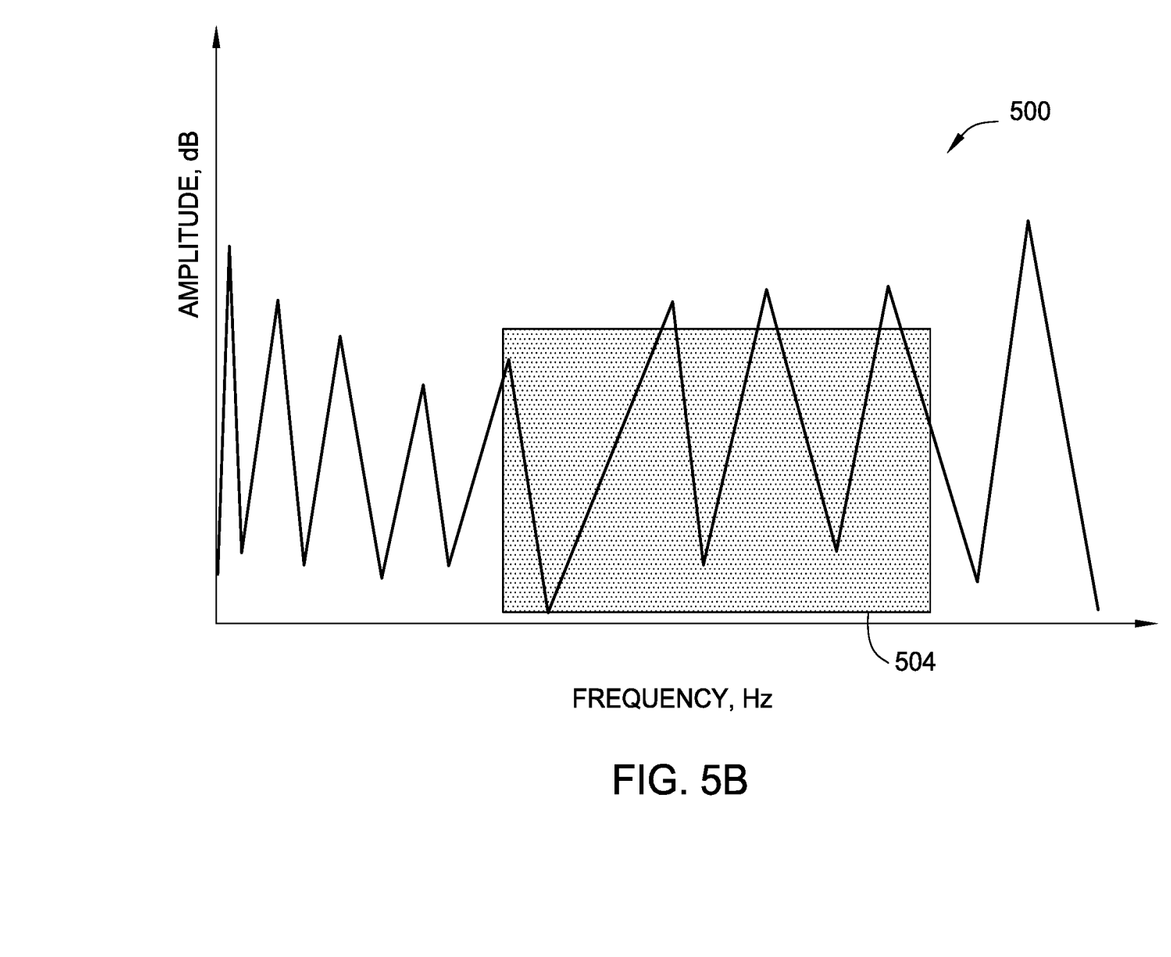
FIG. 5B shows a resized window for the frequency spectrum of FIG. 5A, in accordance with certain aspects of the present disclosure.

In another aspect, the window 504 of predetermined frequency and amplitude ranges is customizable and adjustable. FIG. 5B shows the frequency spectrum 500 of FIG. 5A with a resized window 504, in accordance with certain aspects of the disclosure. The resized window 504 may be resized to adjust when a threshold amplitude or a count of frequency components has been exceeded (e.g., the top edge of the window 504), as well as the frequency range of interest (e.g., the sides of the window 504), as described above.

Returning to FIG. 3, the sensor assembly 300 may be configured for operation in a number of different modes, and data may be output from the sensor assembly in various ways. For example, the sensor assembly 300 may be operated continuously or, in an effort to save power, the sensor assembly may take measurements periodically (e.g., via a power-on and power-off cycle). Furthermore, time-domain and/or frequency-domain data may be stored in the memory 314 for certain aspects and subsequently extracted. For other aspects, the time-domain and/or frequency-domain data may be streamed continuously or sent intermittently. For certain aspects, the data may be transmitted by wire or wirelessly (e.g., via WiFi or Bluetooth) to a computer, for example, for more detailed analysis than that offered by the sensor assembly. For certain aspects, wired or wireless communication may occur between the sensor assembly 300 and the motor control panel 140. The sensor assembly may have a remote connection to a gateway box or control unit, and the gateway box or control unit may have a wired connection to a pump off controller. The gateway box or control unit may also indicate when service is to be required, trigger an alarm, or have the ability to shut the pump off. Data from the sensor assembly and/or the computer may be communicated to the Internet or an intranet, for example, to notify users of maintenance or failure issues or to perform analysis.

According to certain aspects, multiple signatures may be identified using one sensor assembly. For example, a sensor assembly placed on the wrist pin cap to measure the wrist pin bearings also has a direct connection to the gearbox. Thus, the sensor assembly placed on the wrist pin cap may also measure the vibrations of the gearbox. The sensor assembly may be configured to monitor the status of multiple components with identifiable signatures. Furthermore, the sensor assembly may be able to pick up airborne vibrations from nearby sound generators.

Figure 6:
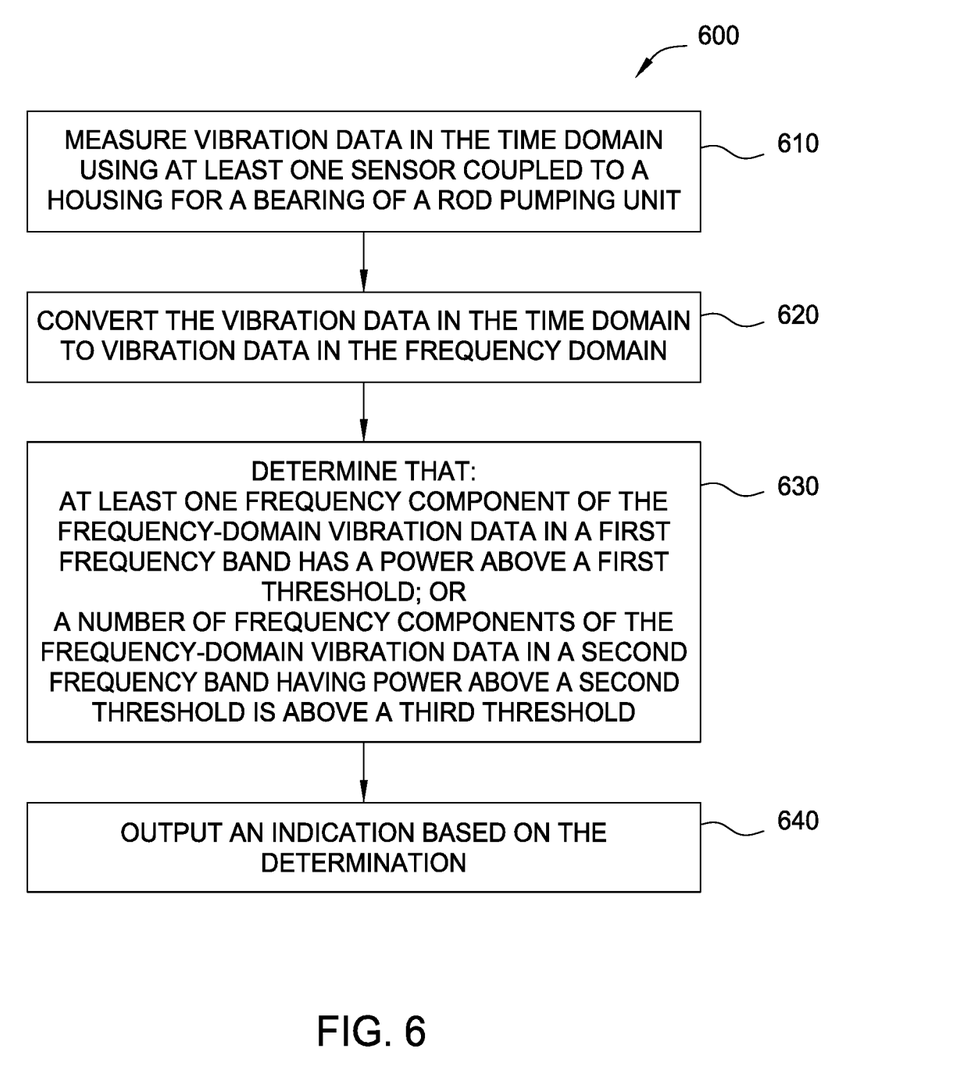
FIG. 6 is a flow diagram of example operations for a rod pumping unit, in accordance with certain aspects of the present disclosure.

FIG. 6 is a flow diagram of example operations 600 for operating a rod pumping unit (e.g., unit 100) for a wellbore, in accordance with certain aspects of the disclosure. Performing the operations 600 may prevent damage to the rod pumping unit. In some cases, performing the operations 600 may identify wear of moving components (e.g., bearings) to prevent further damage to the pumping unit. The operations 600 may be performed, for example, by a sensor assembly (e.g., sensor assembly 300).

The operations 600 may begin, at block 610, by measuring vibration data of the pumping unit in the time domain. Measuring at block 610 may include using at least one sensor (e.g., sensor 171) coupled to a housing (e.g., a wrist pin housing, a saddle bearing housing, a tail bearing housing, or a gearbox housing) for a bearing or other moving component. For example, the sensor may include an accelerometer configured to measure vibration. The sensor may be coupled to the housing at a position close to the components (e.g., bearings) of interest, such as a wrist pin housing (e.g., crank pin assembly 128), a gearbox, a saddle bearing housing, or a tail bearing housing (e.g., an equalizer bearing assembly).

At block 620, the vibration data in the time domain is converted to vibration data in the frequency domain. For example, the time-domain vibration data may be converted to the frequency domain using an FFT or a DFT.

At block 630, it is determined that at least one frequency component (e.g., frequency components 401) of the frequency-domain vibration data in a first frequency band (e.g., frequency range 402) has power above a first threshold (e.g., threshold amplitude 403) or that a number of frequency components (e.g., frequency components 406) of the frequency-domain vibration data in a second frequency band (e.g., frequency range 404) having power above a second threshold (e.g., threshold 405) is above a third threshold. In cases where the at least one sensor includes at least one accelerometer, the first and second thresholds may represent the same or different g-force values. The third threshold may be a positive integer (e.g., representing a threshold count of frequency components).

The determination that the at least one frequency component in the first frequency band has a power above the first threshold may indicate an onset of excessive wear or mechanical damage to the bearing (e.g., level three). The determination that the number of frequency components in the second frequency band is above the third threshold may indicate impending failure of the bearing (e.g., level four).

The second frequency band may have higher frequencies than those in the first frequency band. For example, the second frequency band may have frequencies greater than about 6 Hz (e.g., between 6 Hz and 13 Hz or between 8 Hz and 12 Hz), and the first frequency band may have frequencies less than about 6 Hz, or less than about 3 Hz (e.g., between 0 and 1 Hz, or between 0 and 2 Hz).

At block 640, an indication is output based on the determination at block 630. For example, a frequency component in the first frequency band had power above the first threshold, and an indication is output that the bearing was wearing beyond a suitable amount. For certain aspects, outputting the indication at block 640 includes at least one of displaying a visual indication (e.g., a blinking light-emitting diode (LED) or other light source) or sounding an audible indication (e.g., an alarm) for an operator of the rod pumping unit.

According to certain aspects, the operations 600 may further involve causing the rod pumping unit to cease pumping based on the determination at block 630 that the number of the frequency components in the second frequency band is above the third threshold.

According to certain aspects, the operations 600 may further entail adjusting at least one of the first threshold or a width of the first frequency band. The adjusting may be based on at least one of a type of the bearing, dimensions of the bearing, or dimensions of the housing.

According to certain aspects, the operations 600 may further include adjusting at least one of the second threshold, the third threshold, or a width of the second frequency band.

According to certain aspects, the operations 600 may further involve powering down the at least one sensor after the measuring at block 610 for an interval and periodically powering on the at least one sensor to perform at least the measuring again.

According to certain aspects, the operations 600 may further entail wirelessly transmitting at least one of the time-domain or the frequency-domain vibration data to a processing system.

According to certain aspects, at least the measuring at block 610, the converting at block 620, and the determining at block 630 are performed by a sensor module (e.g., the sensor assembly 300) coupled to a cap attached to the housing.

Certain aspects of the present disclosure provide an apparatus for monitoring a bearing in a rod pumping unit for a wellbore. The apparatus generally includes at least one sensor configured to measure vibration data in the time domain and at least one processor electrically coupled to the sensor. The least one processor is configured to convert the vibration data in the time domain to vibration data in the frequency domain; to determine that: (1) at least one frequency component of the frequency-domain vibration data in a first frequency band has a power above a first threshold or (2) a number of frequency components of the frequency-domain vibration data in a second frequency band having power above a second threshold is above a third threshold; and to output an indication based on the determination.

According to certain aspects, the apparatus further includes a housing containing the at least one sensor and the at least one processor, wherein the housing is configured to be coupled to another housing for the bearing in the rod pumping unit.

According to certain aspects, the apparatus further comprises a wireless transmitter configured to wirelessly transmit at least one of the time-domain or the frequency-domain vibration data to a wireless receiver.

According to certain aspects, the apparatus further includes sound-dampening material configured to attenuate noise signals (e.g., vibrational signals from sources other than the source(s) of interest) measured by the at least one sensor.

According to certain aspects, the at least one sensor comprises at least one accelerometer. In this case, the first threshold may represent a g-force value.

According to certain aspects, the apparatus further includes at least one of a visual indictor or an audible indicator configured to display a visual indication or sound an audible indication, respectively, for an operator of the rod pumping unit, based on the indication output based on the determination.

Any of the operations described above, such as the operations 600, may be included as instructions in a computer-readable medium for execution by the controller 302 or any other suitable processing system. The computer-readable medium may comprise any suitable memory for storing instructions, such as read-only memory (ROM), random access memory (RAM), flash memory, an electrically erasable programmable ROM (EEPROM), a compact disc ROM (CD-ROM), or a floppy disk.

Certain aspects of the present disclosure provide a non-transitory computer-readable medium for operating a rod pumping unit for a wellbore. The medium generally includes instructions executable by one or more processors to: receive vibration data in the time domain from at least one sensor coupled to a housing for a bearing of the rod pumping unit; convert the vibration data in the time domain to vibration data in the frequency domain; determine that: (1) at least one frequency component of the frequency-domain vibration data in a first frequency band has a power above a first threshold or (2) a number of frequency components of the frequency-domain vibration data in a second frequency band having power above a second threshold is above a third threshold; and output an indication based on the determination.

Aspects of the present disclosure provide techniques and apparatus for measuring vibration of a surface rod pumping unit in-situ and analyzing the measurements to predict the onset of bearing failure. For example, counting the occurrences of peaks above a threshold in a band of frequencies may be used as a criterion for wear or other failure indicators.

While the foregoing is directed to aspects of the present disclosure, other and further aspects of the disclosure may be devised without departing from the basic scope thereof, and the scope thereof is determined by the claims that follow.

The invention claimed is:

1. A method for operating a rod pumping unit for a wellbore, comprising:
   measuring vibration data in the time domain using at least one sensor attached to a wrist pin housing at least partially enclosing a wrist pin bearing of the rod pumping unit;
   converting the vibration data in the time domain to vibration data in the frequency domain;
   determining that:
      at least one frequency component of the frequency-domain vibration data in a first frequency band has a power above a first threshold; or
      a number of frequency components of the frequency-domain vibration data in a second frequency band having power above a second threshold is above a third threshold, wherein at least one of the at least one frequency component in the first frequency band or the frequency components in the second frequency band are characteristic of the wrist pin bearing; and
   taking an action related to operating the rod pumping unit, based on the determination, wherein taking the action comprises causing the rod pumping unit to cease pumping.

2. The method of claim 1, wherein the second frequency band comprises higher frequencies than those in the first frequency band.

3. The method of claim 2, wherein the second frequency band has frequencies greater than about 6 Hz and wherein the first frequency band has frequencies less than about 6 Hz.

4. The method of claim 1, further comprising adjusting at least one of the first threshold or a width of the first frequency band, wherein the adjusting is based on at least one of dimensions of the wrist pin bearing or dimensions of the wrist pin housing.

5. The method of claim 1, further comprising adjusting at least one of the second threshold, the third threshold, or a width of the second frequency band.

6. The method of claim 1, wherein the converting comprises using a fast Fourier transform (FFT).

7. The method of claim 1, wherein the at least one sensor comprises at least one accelerometer and wherein the first threshold represents a g-force value.

8. The method of claim 1, wherein:
   the determination that the at least one frequency component in the first frequency band has a power above the first threshold indicates an onset of excessive wear or mechanical damage to the wrist pin bearing; and
   the determination that the number of frequency components in the second frequency band is above the third threshold indicates impending failure of the wrist pin bearing.

9. The method of claim 1, further comprising:
   powering down the at least one sensor after the measuring for an interval; and
   periodically powering on the at least one sensor to perform at least the measuring.

10. The method of claim 1, further comprising wirelessly transmitting at least one of the time-domain or the frequency-domain vibration data to a processing system.

11. The method of claim 1, wherein the third threshold is a positive integer.

12. The method of claim 1, wherein the at least one sensor is configured to be magnetically coupled to the wrist pin housing at least partially enclosing the wrist pin bearing in the rod pumping unit.

13. The method of claim 1, wherein the determination that the at least one frequency component in the second frequency band has the power above the third threshold indicates an onset of excessive wear or mechanical damage to the wrist pin bearing.

14. An apparatus for monitoring a wrist pin bearing in a rod pumping unit for a wellbore, comprising:
   at least one sensor configured to measure vibration data associated with the wrist pin bearing in the time domain;
   at least one processor electrically coupled to the sensor and configured to:
      convert the vibration data in the time domain to vibration data in the frequency domain;
      determine that:
         at least one frequency component of the frequency-domain vibration data in a first frequency band has a power above a first threshold; or
         a number of frequency components of the frequency-domain vibration data in a second frequency band having power above a second threshold is above a third threshold, wherein at least one of the at least one frequency component in the first frequency band or the frequency components in the second frequency band are characteristic of the wrist pin bearing; and
      cause taking an action, based on the determination, wherein taking the action comprises at least one of causing the rod pumping unit to cease pumping, displaying a visual indication for an operator of the rod pumping unit, or sounding an audible indication for the operator of the rod pumping unit; and
   a housing containing the at least one sensor and the at least one processor, wherein the housing is configured to be bolted onto or magnetically coupled to a wrist pin housing at least partially enclosing the wrist pin bearing in the rod pumping unit.

15. The apparatus of claim 14, further comprising an input/output interface configured for wireless communications to wirelessly transmit at least one of the time-domain or the frequency-domain vibration data to a wireless receiver.

16. The apparatus of claim 14, wherein the at least one sensor comprises at least one accelerometer and wherein the first threshold represents a g-force value.

17. The apparatus of claim 14, further comprising at least one of a visual indicator or an audible indicator configured to display the visual indication or sound the audible indication for the operator of the rod pumping unit.

18. The apparatus of claim 14, wherein the at least one processor is further configured to adjust at least one of the first threshold or a width of the first frequency band, wherein the adjustment is based on at least one of dimensions of the wrist pin bearing or dimensions of the wrist pin housing.

19. The apparatus of claim 14, wherein the determination that the at least one frequency component in the second frequency band has the power above the third threshold indicates an onset of excessive wear or mechanical damage to the wrist pin bearing.

20. A non-transitory computer-readable medium for operating a rod pumping unit for a wellbore, comprising instructions executable by one or more processors to:
 receive vibration data in the time domain from at least one sensor attached to a wrist pin housing at least partially enclosing a wrist pin bearing of the rod pumping unit;
 convert the vibration data in the time domain to vibration data in the frequency domain;
 determine that:
  at least one frequency component of the frequency-domain vibration data in a first frequency band has a power above a first threshold; or
  a number of frequency components of the frequency-domain vibration data in a second frequency band having power above a second threshold is above a third threshold, wherein at least one of the at least one frequency component in the first frequency band or the frequency components in the second frequency band are characteristic of the wrist pin bearing; and
 control operation of the rod pumping unit based on the determination, wherein controlling the operation comprises causing the rod pumping unit to cease pumping.

21. The non-transitory computer-readable medium of claim 20, wherein the instructions are executable by the one or more processors to adjust a width of the first frequency band, wherein the adjusting is based on at least one of dimensions of the wrist pin bearing or dimensions of the wrist pin housing.

22. The non-transitory computer-readable medium of claim 20, wherein the determination that the at least one frequency component in the second frequency band has the power above the third threshold indicates an onset of excessive wear or mechanical damage to the wrist pin bearing.

* * * * *